(12) United States Patent
Herberger et al.

(10) Patent No.: US 7,747,575 B2
(45) Date of Patent: Jun. 29, 2010

(54) APPLICATION-SPECIFIC INTELLIGENT BACKUP AND RESTORE SYSTEM

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 335 days.

(21) Appl. No.: 11/936,603

(22) Filed: Nov. 7, 2007

(65) Prior Publication Data

US 2008/0109495 A1     May 8, 2008

Related U.S. Application Data

(60) Provisional application No. 60/857,549, filed on Nov. 7, 2006.

(51) Int. Cl.
*G06F 17/30* (2006.01)
(52) U.S. Cl. .................................. 707/640
(58) Field of Classification Search ................ 707/100, 707/204, 640; 717/168
See application file for complete search history.

(56) References Cited

U.S. PATENT DOCUMENTS

| | | | |
|---|---|---|---|
| 6,434,744 B1 * | 8/2002 | Chamberlain et al. | 717/168 |
| 6,934,722 B1 * | 8/2005 | Goshey et al. | 707/204 |
| 6,948,038 B2 | 9/2005 | Berkowitz et al. | |
| 7,024,527 B1 | 4/2006 | Ohr | |
| 7,051,327 B1 | 5/2006 | Milius et al. | |
| 7,080,279 B2 | 7/2006 | Asare et al. | |
| 2004/0107199 A1* | 6/2004 | Dalrymple et al. | 707/100 |
| 2005/0102396 A1 | 5/2005 | Hipp | |
| 2007/0073735 A1* | 3/2007 | Clarke | 707/100 |

FOREIGN PATENT DOCUMENTS

WO    WO 2004086226 A1    10/2004

* cited by examiner

*Primary Examiner*—Etienne P LeRoux
(74) *Attorney, Agent, or Firm*—Fellers, Snider, Blankenship, Bailey & Tippens, P.C.; Terry L. Watt

(57) ABSTRACT

There is provided herein an application-oriented backup and restore system, which leads the user through a plurality of different selectable steps to repair specific application errors/problems. The preferred embodiment minimizes the loss of user productivity and because of its easy and accessible layout and presentation it may eliminate the need for tech-support to repair the problem. The average user can initiate the steps, wherein the restore steps are explicitly directed to secure the safe storage of user created documents and files.

15 Claims, 6 Drawing Sheets

APPLICATION-SPECIFIC INTELLIGENT BACKUP AND RESTORE SYSTEM

This application claims the benefit of U.S. Provisional Patent Application Ser. No. 60/857,549, filed on Nov. 7, 2006, the disclosure of which is incorporated herein by reference as if fully set out at this point.

FIELD OF THE INVENTION

The present invention relates generally to the field of data backup and restoration. More particularly, this invention concerns systems and methods for returning non-function computer programs to an operational status.

BACKGROUND OF THE INVENTION

In the last 20 years personal computers have undergone enormous advancements in usability. This development has resulted in substantially deeper market penetration among people who might have little or no inclination to spend time learning to use them. From a device that was routinely used by only a few highly trained professionals, it has developed into a near-essential device that enables millions of people each day to accomplish their work and leisure tasks. One side effect of this enormous growth rate is that most users know little or nothing about the inner-workings of their personal computer and, of course, also do not know the configuration settings of the applications that they use. In some ways this is comparable to the attitude many people have regarding their cars: they know how to drive them but don't know how to repair them. In the context of this application, this type of user will be called an "average" user. In some sense, this development is a good thing, because it demonstrates that the personal computer has grown into a reliable tool and that, no great amount of training is required to operate one However, this attitude can be counterproductive when problems occur. Broadly speaking, these types of problems can be generally categorized as being either application-based problems or operating system-based problems. Even an average user can usually distinguish between these two types of problems if for no other reason than operating system—problems usually lead to a non-functioning computer. Normally when such problems occur, the user either calls for tech support (if the problem arises at work) or approaches a friend (if the problem occurs at home) to get help. Alternatively, of course, most users know that a reset or reboot of the computer solves many operating system problems. On the other hand, when an application-based problem occurs, the operating system is usually still functioning and the problems are confined to a single application. The sorts of application-based problems that users might encounter include an inability for the user to restart the application after a crash, files that cannot be opened or saved from within the application, program outputs that are inconsistent with prior results and/or expected results, etc. In case of an application-based problem, the average user usually will call tech support or a friend and ask for help in eliminating the problem. However, application specific problems may require a much greater familiarity with both user's system software and the offending application than might be readily available.

The search for the source of an application problem might take, depending on the type of the error, only a few minutes. On the other hand, it could potentially require an expert several hours to pinpoint the source of a problem with a complex computer program. Additionally, after it is identified the effort to fix the error likely will require additional time, which impacts the user's productivity and occupies tech-support resources until the problem is solved.

The cause of an application failure might be very complex. Those of ordinary skill in the art will recognize that common sources of application problems include errors in specifying the configuration of the application, accidentally deleted support files, corrupted data and/or support files, corruption of the application by virus, application error introduced by a revision update, errors that occur after an update of the operating system, etc. Because of the multiplicity of possible causes, in some cases, tech-support will elect to re-install the offending application from a backup. However, that approach is not without its own problems.

Software to create and restore computer backups has been an integral part of computer system maintenance from the beginning. Initially backup technology was used exclusively to prevent data loss, but in recent years system administrators have come to recognize and utilize backups to fix software problems by reverting the problem application to an earlier state. Those of ordinary skill in the art will recognize that a backup typically consists of a complete image of a particular hard disk that contains all the files that were stored on that disk at the time the backup was created. The system administrator or user is typically able to use a system backup to a) recover his or her data in case of data loss and b) re-set all of the files on the hard disk to the state they were in at some earlier point in time.

There are a number of different techniques for creating and updating backups. One of these variants is the incremental backup, wherein only data that is new or has changed since the last backup (usually the last incremental backup, or last full backup) is written to the backup media. In the case of an incremental backup, each backup is based on the previous incremental backup and in order for a successful restore to take place, at least one previous incremental backup will typically be needed. Another variant is the differential backup, wherein only the files that have been changed or that have been newly created since the last full backup are written to the backup media. Both of these variants have advantages and disadvantages. For example, with respect to the incremental backup, the backup process is typically fairly quick and the amount of data transferred is relatively small; however the effort required to restore data will likely be greater because a number of different incremental backups may have to be accessed one after another. In case of the differential backup, the effort required to restore the system to its earlier state is typically considerably smaller because only two backups (e.g., the last full backup and the last differential backup) will typically have to be accessed. The amount of data transferred during each backup, however, can be considerably higher and the time to create the backup (as compared with the incremental backup) will also be higher.

Any of the above-described backup solutions could potentially be used to revert an application to a previous state. However, these sorts of traditional approaches tend to be overkill for application-based problems as they restore or overwrite much more information than is strictly necessary, including possibly overwriting user created data items that were—created or modified since the backup and which are not associated with the problem.

Thus, the process of eliminating application-based problems by restoring a computer to a pre-problem state can be quite labor intensive, because, first, the source of the error must be found, then the correct data image will need to be selected. These steps result in lost productivity hours for the average user. Additionally, there is no guarantee that files which have been created since the last backup can be saved by using a backup to address software problems. In fact, created user documents will typically be lost if additional effort (and further loss of productivity) is not expended in specifying the exact files to be restored. For example, the user will generally need to identify the documents/files manually and these files will have to be temporarily moved after they are located, else they will be overwritten. So the above described solutions lead to loss of work hours for the user and substantial effort on the part of tech-support to fix the problem and restore the personal computer to the same state that it was in before the occurrence of the problem. Additionally, in case of the backup approach to alleviating software problems there is usually no consideration given to preservation of user-created documents and files.

Thus what is needed is a method that addresses the above-identified problems. The method should be able to reduce the time required to return an application to an operational status and should also provide the average user with an option to initiate the problem solution on his/her own. The method and system should, to the extent possible, ensure that the average user does not experience data loss.

Accordingly it should now be recognized, as was recognized by the present inventors, that there exists, and has existed for some time, a very real need for a system and method that would address and solve the above-described problems.

Before proceeding to a description of the present invention, however it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein an application-specific intelligent backup and restore system and method, wherein the average user will be able to repair application problems via the sequence of steps taught herein. The instant invention preferably comprises a series of steps which are presented to the user either via a graphical user interface or which are executed automatically and without notification to the user. The system will preferably reduce the user's down time and also reduce of the need for tech-support staff when application specific problems are encountered. The instant backup and restore system is also designed to minimize the personal data that might be lost when the application is restored. The instant system and method are best used to correct an application program error on a personal computer in either an office or home environment. The instant invention is intended to protect the user's data to the extent possible and additionally to minimize the problems associated with eliminating software issues on a personal computer. The system will preferably allow users to initiate and direct application specific repair options by selecting options that are preferably presented via a graphical user interface.

In brief, the instant invention preferably features a step-by-step process, in which each step will be visually presented to the user and wherein after each step the instant invention will preferably automatically—test the target application program to see if the previous step has eliminated a program error. The backup and restore method and system will preferably be application-oriented, and will preferably permit the user to eliminate application errors by following the preferred steps of the instant invention. The instant system improves on prior art backup-based approaches by using an approach that is application-specific. To implement the preferred steps of the instant invention, the system will preferably use a full backup of the hard disk (or disks) that contain the target program together with information files, that might be either specific to an individual application (e.g., .ini or configuration files) or that might be global (i.e., system wide/registry file) information files.

The application specific files will preferably contain data about the target application, data such as the files belonging to (e.g., used by) the application, files related to the initialization of the program (e.g., ".ini" files), registry settings of the application, the location of configuration and setup files, etc., collectively these sorts of files will be referred to as "program specific" or "application specific" files hereinafter.

According to a preferred embodiment, the instant invention preferably begins with the creation of (or accessing) a full backup of a user specified hard disk, wherein the full backup can be a sector-based backup or a simple file backup. Additionally, the preferred backup of the instant invention will contain application specific files for each application contained in the full backup. These files could be contained within (or take the form of) a single global file that contains the pertinent information for all applications, or the files might be separately created for each application, e.g., while a backup is being conducted. A full backup will preferably provide an operating basis for the instant invention and, of course, such are routinely created according to methods well known to those of ordinary skill in the art and might be, e.g., a full backup, incremental backup or differential backup.

In a next preferred step, the instant invention will be activated when a problem occurs with an application. The problem could be, by way of example only, the inability to start the application or an immediate crash after it is started, an inability to load or save documents, unexpected (e.g., inconsistent or wrong) program results, etc. The user will preferably initiate a program that implements the methods of the instant invention and the previously created or the latest backup file will be selected and opened. In the next step, the instant invention will preferably automatically create an application list, wherein this list will preferably contain every application that is part of the full backup image. The application list will preferably contain pointers to the program-specific files on the full backup image.

As a next preferred step, the user will select the target application from among the applications contained within the backup and the instant invention will automatically proceed to restore phase 1. Restore phase 1 will preferably be directed to steps connected with less intrusive restoration actions, whereof, restore phase 2 preferably involves actions that implement more changes to the application files. In each phase the user will preferably have the option of changing from a plurality of available options, wherein the selection of these options might be presented to the user as a menu or the options might be presented as consecutive choices, wherein one option must be initiated before the next option becomes available for selection.

The selectable options of restore phase 1 will preferably be aimed at restoring the configuration files, registry settings, and other application specific settings of the problem application or, alternatively, restoring the configuration files and registry settings of all applications. In the next preferred step, the user will preferably choose the option that he or she thinks is the most efficient and, as was previously described, the selection of these options might also be presented to the user as a single menu or a step-wise selection (i.e., after it becomes clear the first option did not yield the desired result, a second choice will become available). After the selection of one restore option the instant invention will either preferably open the information file that is connected with the selected application or the instant invention will open the global information file (depending which approach has been chosen) and will parse the information file to acquire the necessary information about the problem application. In the next preferred step, the instant invention will extract the needed information from the information file and transfer the appropriate files from the full backup image to their target directories overwriting the existing files.

After the transfer of the files to the target directories, the instant invention will preferably automatically start a test run of the target application to determine whether this step remedied the problem associated with the application. If the problem is eliminated, the instant invention will preferably stop here, otherwise the invention will proceed to restore phase 2, wherein options comparable to those of restore phase 1 are preferably presented either as a menu or a sequential series of steps. The user will preferably be able to choose between the full restore of the problem application, the full restore of all applications belonging to the operating system, or the full restore of all applications. In each of the selectable options, the instant invention will preferably automatically restore all files, the configuration files and the registry settings of the applications to the appropriate directories, wherein after a selection of an option by the user the necessary information will be extracted from the information file that belongs to the applications that are affected by the selected option. In the next preferred step, the instant invention will transfer the files from the full image backup to the specific target directories according to data contained within the information files. After the successful transfer and overwriting of the files of the specified applications, the instant invention will preferably automatically initiate a test run of the target application. This will allow the user to determine if the selected option delivered the desired result (i.e., if the subject program now functions correctly). If the application is running and the problem is fixed, the instant invention will preferably stop. However, if the problem persists, the instant invention will preferably proceed to the next step.

The next step will preferably be to repair the problem application by initiating a restore of all the data from the full backup to the hard disk overwriting every available file on that disk.

It should be clear that a step-wise approach such as this would be a tremendous aid to the average user who is simply working with his or her personal computer and who does not have the knowledge to quickly fix problems with installed applications. The instant invention will provide the user with an easy-to-use, application-oriented, intelligent backup and restore system which preferably will feature a graphical user interface that guides the user through the preferred steps. The step-wise process potentially reduces the amount of time required to correct the problem while also maintaining the safety of the user's documents and other files. Note that the instant invention is application-specific in that the preferred restore options are intended to quickly re-establish the functionality of the application if a problem occurs during execution. The approach of the instant invention also allows the user to fix many problems without calling tech support, thereby freeing tech support to work on more important tasks.

The foregoing has outlined in broad terms the more important features of the invention disclosed herein, so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

DESCRIPTION OF THE PREFERRED EMBODIMENTS

Figure 1:
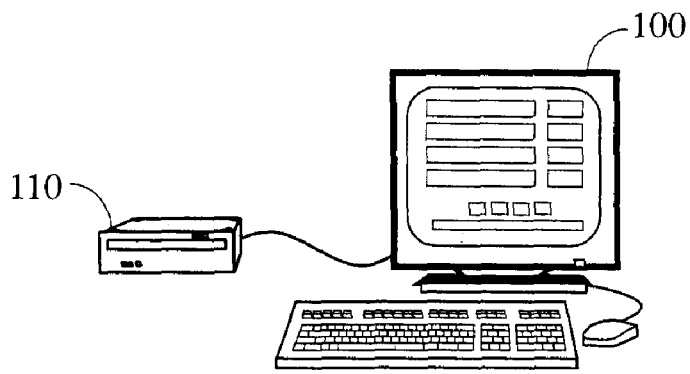
FIG. 1 depicts the general working environment of the instant invention.

Referring now to the drawings, wherein the reference numerals indicate the same parts throughout the several views, there is provided an application-specific backup and restore system which significantly reduces the loss of work hours due to application-problems and which additionally features a specific attention to secure the created documents and files of the user. The instant invention enables the average user to initiate the steps to repair application-specific problems on its own by supplying the user with a graphical user interface directed to guide the user through a step-by-step process to remedy the application problem.

By way of general explanation and in accord with the preferred embodiment, it is to be understood that when the phrase "application-specific backup and restore system" is used herein that usage will preferably be interpreted as meaning providing a step-wise process which allows the user to quickly and easily repair application-specific problems. Additionally, to that the instant invention will preferably fix these sorts of problems without destroying or overwriting any user-created documents or other files.

The preferred embodiment of the instant invention is a specific combination of backup and restore operations which can be initiated by the average user in a step-by-step progression. The user interaction will preferably be implemented by providing the user with a graphical user interface that guides the user through the different steps of the instant invention. The different steps implement various restore options that read from a previously created backup image. The restore options are designed to ensure that no user created documents and files will be overwritten or destroyed by the selected option until it is absolutely necessary to do so. The workflows and additional specifications regarding the instant invention will be described in more detail below.

As is generally indicated in FIG. 1, at least a portion of the instant invention will be implemented in form of software running on a users computer 100. Such a computer will have some amount of program memory and hard disc storage (whether internal or accessible via a network) as is conventionally utilized by such units. Additionally a CD/DVD burner 110 could be connected to the computer, which could be useful for read and/or storing in progress or completed works.

Figure 2:
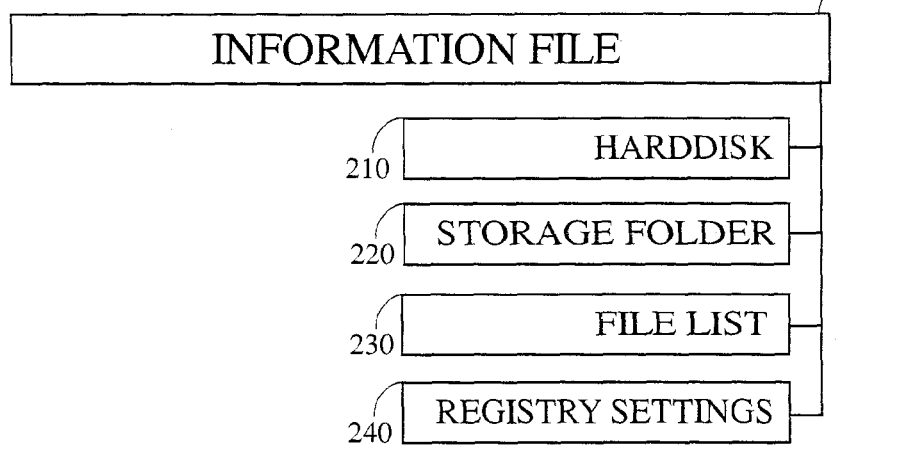
FIG. 2 illustrates the specific internal data setup of the information file.

Turning next to FIG. 2, this figure illustrates a preferred internal data layout of the information file which will preferably be utilized by the instant invention. The information file 200 will preferably be a document containing data that describes the various application programs that are stored on a user's hard disk and which are a part of the users full image backup or latest differential or incremental backup. The information file 200 can be implemented as a global document containing the information for all applications that are an installed part of the users hard disk, but it can also be implemented in a single-file approach, wherein each application is assigned a separate information file. Preferably, an information file 200 will contain information such as the hard disk 210 on which the application is stored, the folder name and path 220 to the folder of the application (e.g., a pointer to that application), a complete listing of all the files that are a part of the application 230, and the path and content of the registry settings 240 that are connected to that particular application. The file list 230 will preferably comprise all files that are a part of the application and that are stored in the application folder and, additionally, all files that are a part of the application and may be created and/or stored in different folders. The information file or files 200 might be created in a number of different ways. In one preferred embodiment, the information files 200 will be created as the instant invention creates a full backup image. In that case, the instant invention will preferably store the necessary information (hard disk, folder, files) in the appropriate information file when backing up the files of an application and it additionally preferably will initiate a scan of the registry for data pertaining to the currently selected application. In another preferred embodiment, the information files for different popular programs might be available pre-created on an Internet site and these files will be transferred to the user of the instant invention when requested. The information files will preferably contain data that describes the file list and the registry settings, the hard disk and the folder name that contains the selected application. This data, and possibly additional items of interest, will preferably be determined and added automatically by the instant invention to the information file 200 during backup. Pre-created information files will preferably be provided for widely used applications. These methods are most useful when creating a new full image backup. Of course, a user of a personal computer installs and removes applications or initiates other changes to the file base from time to time. In these scenarios, after the creation of an initial full backup image, a process will preferably be started which will run in background and which will be constantly overseeing the system and, in case a new application is installed, the background application will create an information file containing the necessary data.

Figure 3:
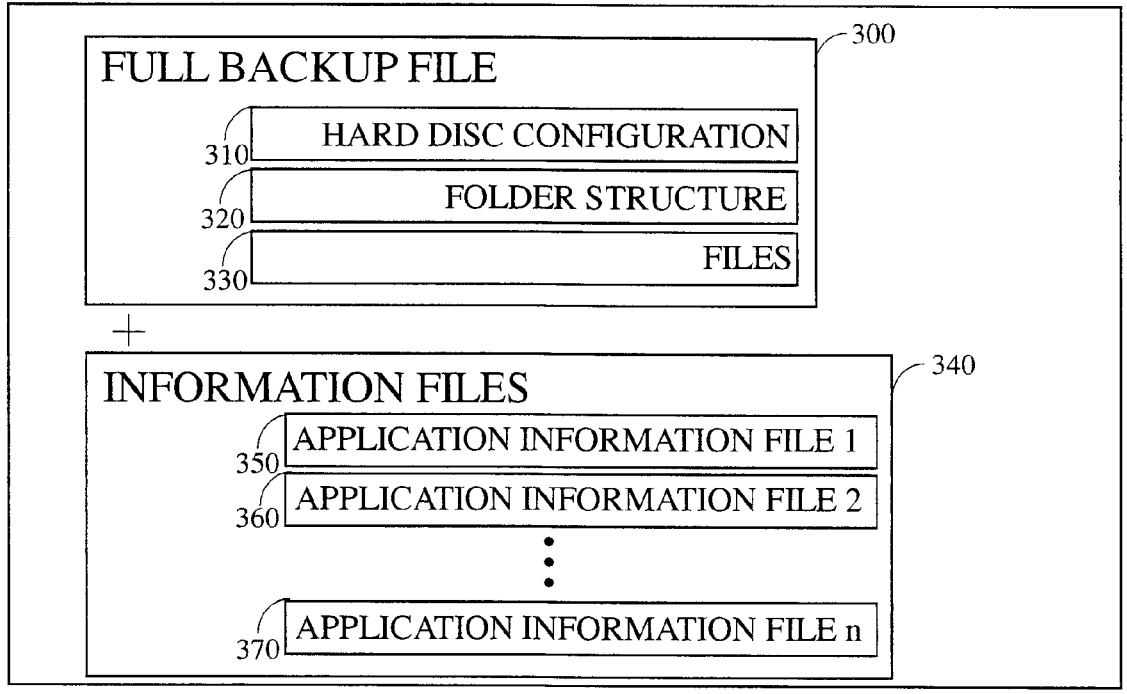
FIG. 3 depicts the general composition of the data basis of the instant invention.

Now turning to FIG. 3, this figure illustrates a preferred structure of the database utilized by the instant invention. To achieve the main goals of the instant invention, the system will preferably use a combined data package, this data package will comprise the full backup file 300 of the appropriate hard disk and the collection of information files 340 that contain information about application and other files on that disk. The full backup file 300 will preferably contain information about the hard disk configuration 310 of the personal computer, the folder structure 320 and the files 330 stored on that hard disk in these folders. The collection of information files 340 will preferably contain application associated information files 350, 360 and 370, wherein the index "n" is used to indicate that the number of information files contained in the collection can be arbitrarily large.

Figure 4:
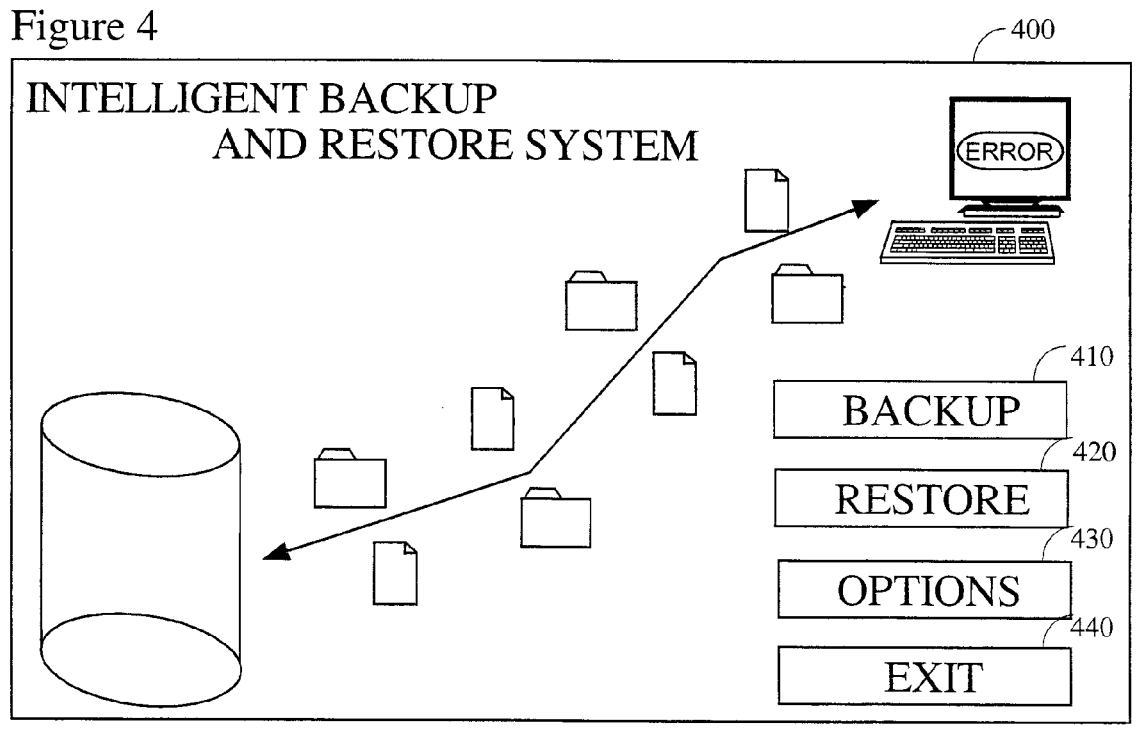
FIG. 4 illustrates the initial graphical user interface of the instant invention.

FIG. 4 illustrates a preferred graphical user interface of the instant invention as it might appear during a first phase restore. The user will preferably be presented with a graphical user interface 400 that allows him or her to initiate actions when working with the instant invention. The user will preferably be able to exit the backup and restore system by activating the appropriate "EXIT" button 440. Additionally, the user might be allowed to change some or all of the program options of the instant invention. For example, options such as the type of backup method that is to be used (e.g., incremental, differential, full, etc.). Such settings will preferably be accessed via the "OPTIONS" button 430 of the graphical user interface. The remaining two options 410 and 420 will preferably allow the user to switch between the two main parts of the instant invention. Selection of the "BACKUP" button 410 will preferably initiate the backup process. Selecting the "RESTORE" button 420 will preferably initiate the step-by-step process aimed at repairing damaged applications.

Figure 5:
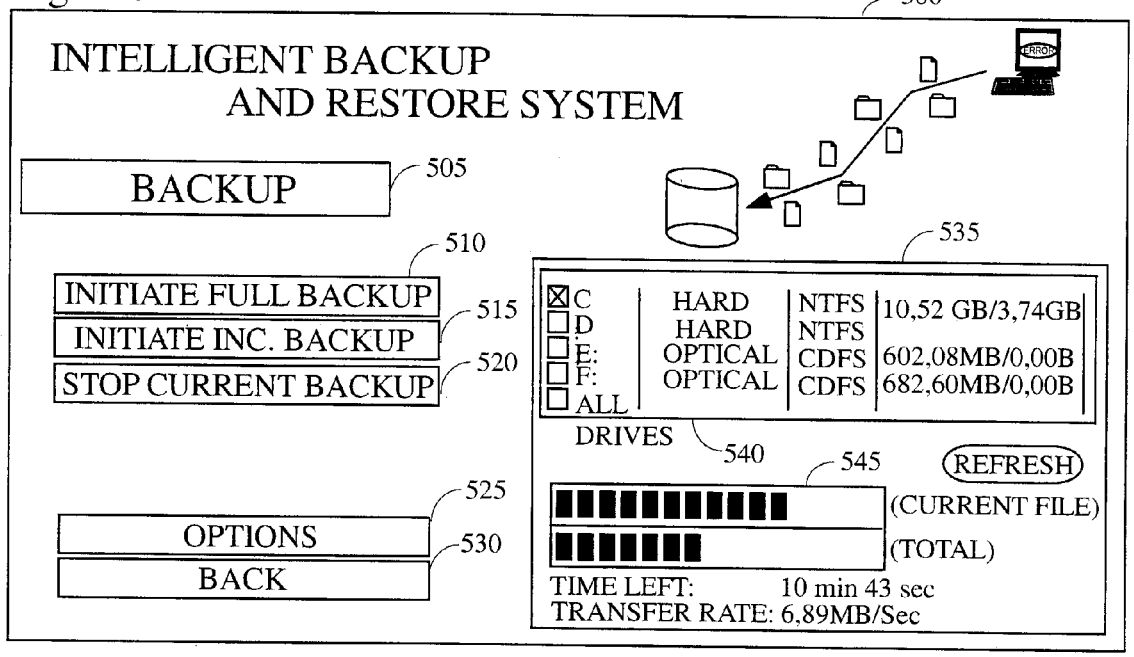
FIG. 5 depicts the graphical user interface of the backup part of the workflow of the instant invention.

FIG. 5 illustrates how the screen of the instant invention will appear after the user has initiated the backup process 500. The user will preferably be informed about the current mode the instant invention 505 is in. The graphical user interface will preferably present the user with options to initiate a full backup 510, to initiate an incremental backup 515 or to stop/start the current backup 520. Additionally the user will preferably be able to define options 525 associated with the backup mode of the instant invention. So, for example, it might be possible for the user to automate the backup creation process by instructing the instant invention to initiate an incremental backup every week at a specific time. If the user decides to leave the backup mode of the instant invention he or she can select the "BACK" button 530 of the graphical user interface. FIG. 5 also depicts the graphical user interface 535 that will preferably be utilized in performing or initiating a backup process. The user will be able to specify hard disks 540 from which the backup will be created and, when the backup creation process is initiated, the graphical user interface preferably will inform the user about the process by displaying a meter 545 (or similar on-screen indicator) that indicates the backup progress of each file and the backup progress of the entire disk. After the backup creation is complete, the instant invention will preferably automatically return to the graphical user interface illustrated in FIG. 4.

Figure 6:
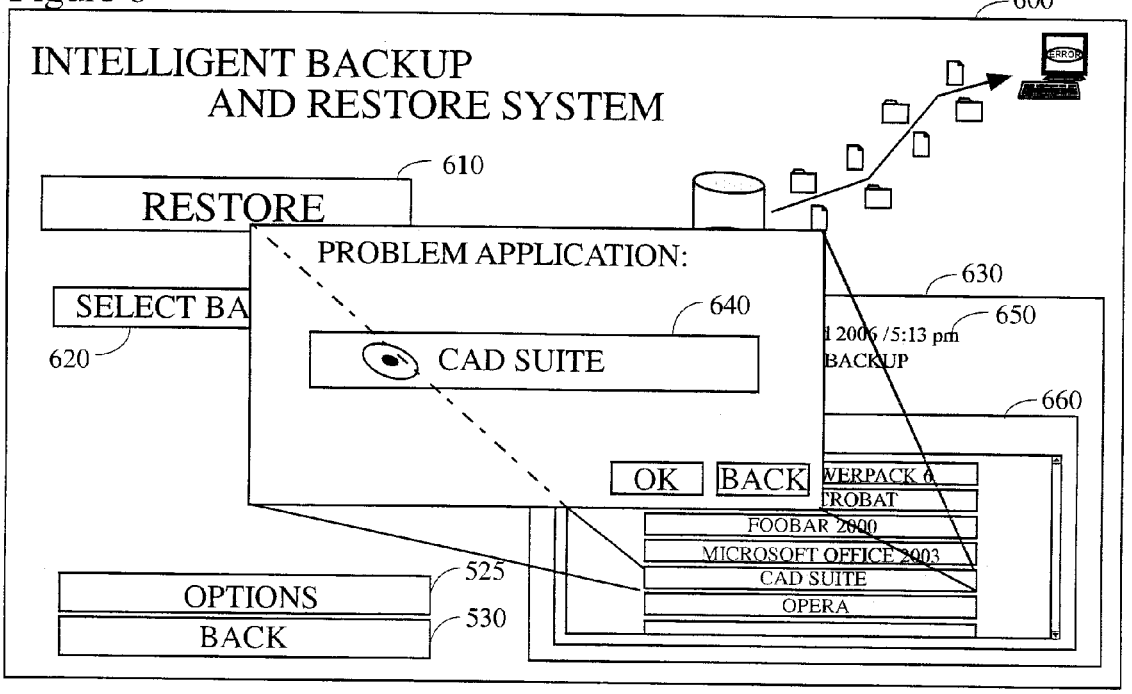
FIG. 6 illustrates how the graphical user interface of the restore part of the instant invention might appear after the selection of a problem application.

Now turning to FIG. 6, this figure depicts how the preferred graphical user interface 600 of the instant invention in the restore mode will be presented to the user. The user will preferably be informed about the current mode 610 of the instant invention. The graphical user interface illustrated in FIG. 6 shows a preferred appearance in an advanced stage of the restore mode of the instant invention. In that stage, the user will have already selected a backup file 620 and the section of the graphical user interface informing the user about the details of the restore mode 630 will preferably have already been populated with information regarding the selected backup file 650. This information preferably includes the date on which the backup file was created and, additionally, it describes the type of the backup (e.g., whether it is a full backup, an incremental, a differential backup, or what). Additionally, the instant invention will preferably have already compiled an application list 660 that identifies the applications that are contained in the full backup. The application list will preferably be created by the instant invention using the information files discussed in connection with FIG. 2. In the particular example of FIG. 6, the user has selected the application "CAD SUITE" as the problem application and the instant invention is confirming the selection and is seeking additional confirmation from the user 640 that the selected application is indeed the problem application. Additionally, the graphical user interface preferably will feature an option to change parameters of the restore mode 525 and an option to go back to the selection menu depicted in FIG. 4.

Figure 7:
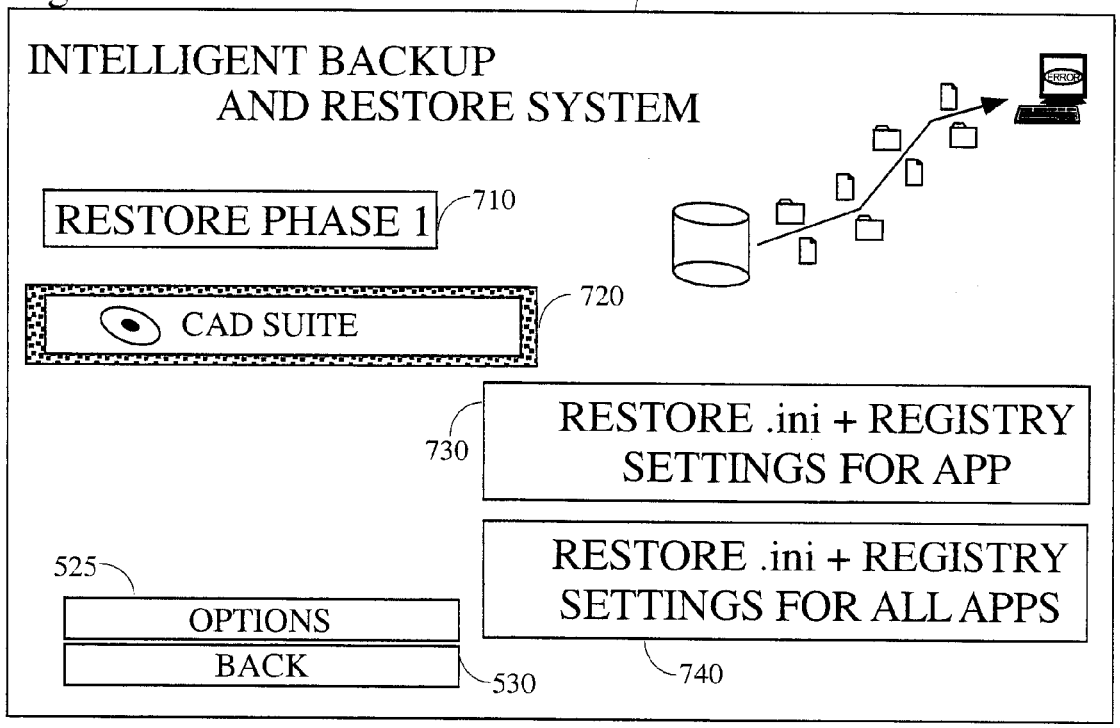
FIG. 7 depicts the graphical user interface of restore phase 1 of the instant invention.

FIG. 7 illustrates the appearance of a preferred graphical user interface of the instant invention after the user has confirmed the selection of the problem application in the first step of the restore mode. The user will preferably be presented with a graphical user interface 700 informing the user about the current stage of the restore mode 710, wherein the restore mode is preferably divided into restore phase 1 and restore phase 2—the preferred specifics of each individual phase will be described below in connection with FIG. 9. Additionally, the instant invention will preferably also inform the user about the selected problem application 720. The user interface will preferably allow the user to specify options 525 associated with the current phase of the restore mode and/or go back one step to the graphical user interface of FIG. 6. Additionally, the user will preferably be presented with two options which will allow the user to activate the individual restore options associated with restore phase 1.

In the first selectable option 730, the instant invention will preferably only restore the configuration files and the registry settings of the problem application. After the selection of this option, the instant invention will preferably open the information file associated with the problem application and will read the information regarding the configuration files and the registry settings from the information file. This information preferably will include the name of the files, the source and target storage point of the files, etc. Given this information, the instant invention will preferably next access the full backup image and will extract the configuration files from it. Note that in the preferred embodiment the registry settings will be preferably stored in their entirety in the appropriate information file. However, they could also be stored in a different file. The extracted configuration files will then preferably be stored at the appropriate target storage points on the hard disk of the personal computer, overwriting the existing files. Similarly, the registry settings will also preferably be automatically written into the registry overwriting the existing entries. The above described steps will preferably be carried out without any visual feedback to the user.

After the instant invention writes the files and registry settings to the appropriate target directories and storage points, the instant invention will next preferably activate the problem application to allow the user to determine if the selected option brought the desired success. If the application is working, the user will typically exit the instant invention; however, if the application is still reporting problems, the instant invention will preferably fall back to the graphical user interface depicted in FIG. 7 allowing the user to select the next option 740. If the user elects to restore the configuration files and the registry settings of all applications in the full backup image, the instant invention will preferably initiate basically the same actions that were initiated after the selection of the restoration of files and registry settings for the problem application. The instant invention will preferably select the information files for all applications and sequentially extract the configuration files and registry settings from the information files and thereafter write these files and settings to the defined target storage points. This process will preferably be executed for all the applications until the files and registry settings for the last application have been restored. This restore process will also be preferably executed without any visual indication to the user, except possibly for a graphical progress meter.

After the successful execution of the restore step the instant invention will preferably activate the problem application. If the application does not report any problems, the user preferably will exit the instant invention. However, if the application still reports problems and is not working correctly the instant invention will preferably automatically advance to restore phase 2, a preferred embodiment of which is illustrated in FIG. 8.

Figure 8:
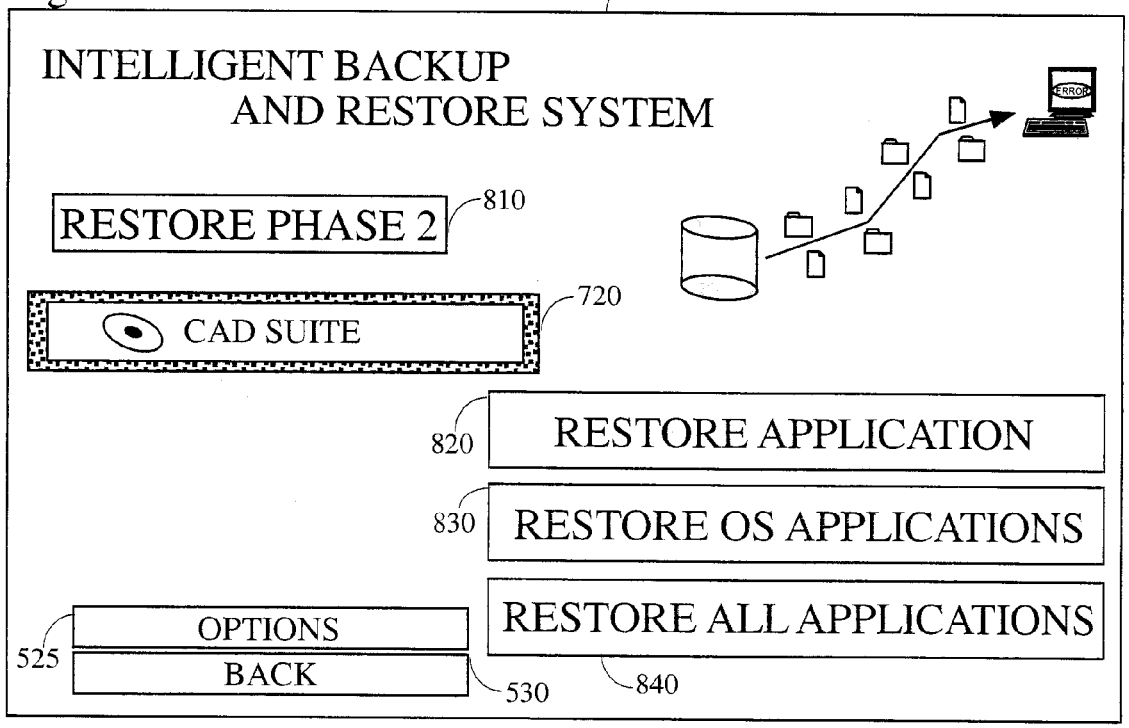
FIG. 8 illustrates the graphical user interface of restore phase 2 of the instant invention.

FIG. 8 depicts a preferred graphical user interface 800 of the instant invention as it might appear in restore phase 2. The user will once again preferably be informed about the current phase of the instant invention 810 and will also preferably be informed about the problem application 720. In restore phase 2, the user will preferably be presented with three selection choices. The first choice will preferably be to restore the problem application 820, wherein with the selection of this option the user initiates a restore of only the problem application. This operation preferably restores all files that are associated with the application, which includes configuration files and files associated with the application itself. Also preferably the registry settings of the problem application will be restored. Once again the preferred source for the restore process is the data stored in the information file.

Another option for the user will be to select to fully restore all applications that are associated with the operating system. For example, in case of the Windows™ operating system this would preferably include applications such as Paint, Outlook Express, Instant Messenger, Media Player, or Movie Maker. The processes that are initiated when selecting these options will preferably be comparable to the processes that are executed when selecting the full restore of the problem application, except a restore of all system applications will likely take more time. The information file is selected by the instant invention, the data (file list, path, registry settings) concerning the operating system applications is read and the restore process is initiated preferably based on that data, overwriting any existing data.

The third option will preferably be to fully restore all applications contained in the full backup image. The instant invention preferably reads the necessary data from the information file or files and initiates the restore process until all of the applications have been fully restored from the full backup image. Following the successful execution of each restore option, the instant invention will preferably automatically initialize the problem application to allow the user to determine if the selected restore option fixed the problem. If the problem is fixed, the user will likely elect to end the processes of the instant invention. Additionally, it should be noted that, although the selection of the restore options of restore phase 2 are depicted as mutually exclusive options, it might also be possible to implement the selection as a step-wise process wherein the individual options depend on each other, e.g., when one option (i.e. full restore of the problem application) does not eliminate the problem the next selectable option becomes selectable (i.e. full restore of all OS applications).

Figure 9:
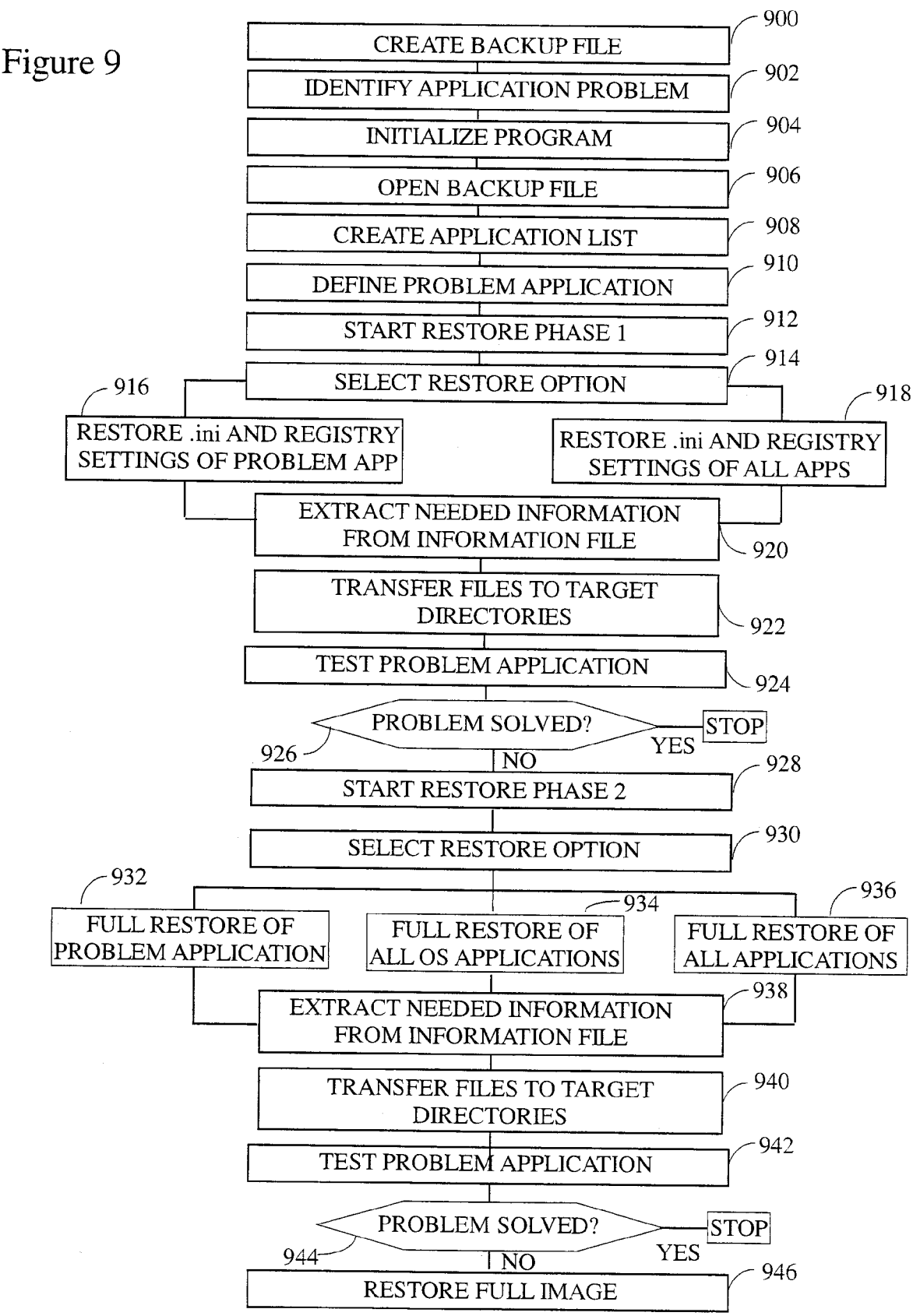
FIG. 9 illustrates a complete flowchart of the instant invention.

Now turning to FIG. 9 which illustrates a preferred workflow of the instant invention, this embodiment of the instant invention preferably begins with the creation of a backup image 900, wherein the backup file can be a full image backup or a differential or incremental backup, as has been discussed previously. However, the processes will preferably become active after the identification of an application-specific problem 902. The program implementing and delivering the steps of the instant invention will be initialized 904 according to methods and procedures well known to someone of ordinary skill in the art. As a first preferred step, the available latest backup image file will be selected and opened 906. In the next preferred step the instant invention will create an application list 908 taken from the information files that are stored or are associated with the backup file. In a next preferred step, the user will be asked to identify the problem application 910 from an application list, wherein after the definition of the problem application the instant invention will move into restore phase 1 912, prompting the user to select a restore option 914. Two restore options will preferably be available to the user in restore phase 1. The first option is preferably to restore configuration files and registry settings of the problem application 916 and the second is preferably to restore configuration files and registry settings of all applications 918. After one of these options has been selected, the instant invention will preferably initiate the corresponding steps, the main difference as compared with previously discussed program options being the amount of data that is to be processed by the instant invention. As a first preferred processing step, the information file that is associated with the problem application or the applications that are affected by the selected options is selected by the instant invention and the needed information is extracted from the information file 920. The extracted information preferably includes the path and name of the configuration files and the path and content of the registry settings.

In a next preferred step, the instant invention will automatically transfer the selected files to the target directories 922 and, after a successful transfer of these files and the entry of the registry settings into the registry, the instant invention will preferably launch the problem application 924 so that the user can determine if the selected options have had the desired effect. If the problem application is working correctly 926, the process of the instant invention will stop here. Otherwise, restore phase 2 (i.e., step 928) will preferably be automatically initiated. In that phase the user will preferably be able to choose between three available restore options 930. He or she can select to fully restore the problem application 932, he or she can choose to fully restore all applications 932, he or she can choose to fully restore all applications that are an initial part of the operating system 934, or he or she can choose to fully restore all applications 936 that are stored in the backup image. These options might be available as alternatives or they might be presented to the user sequentially.

In the first preferred step after the selection of one of the three options mentioned above, the instant invention will preferably open the corresponding information files and will extract the data therefrom 938. In the next preferred step the instant invention will transfer the files to the target directories and will insert the registry settings at the appropriate location in the registry 940. After the transfer of the files, the problem application will preferably be started automatically 942 to let the user determine if the selected option fixed the problem. If the application is working 944, the process of the instant invention will preferably end and the user will be able to terminate the program of the instant invention. If, however, none of these options repaired the problem, the instant invention will preferably automatically restore the complete data from the full image 946 to the hard disk.

Figure 10:
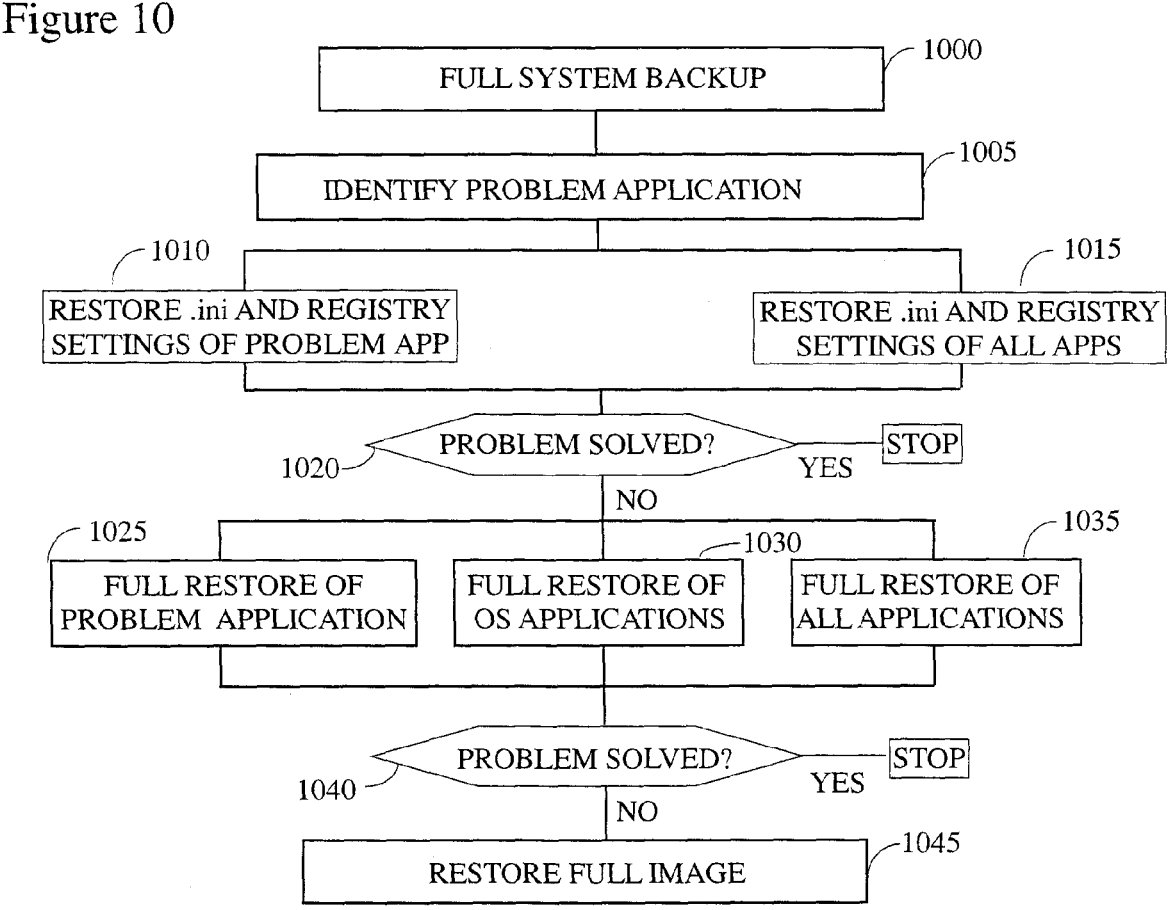
FIG. 10 depicts the flowchart of the instant invention in compressed form.

Turning next to FIG. 10, this figure illustrates a compact version of the preferred workflow depicting the basic steps needed to implement the instant invention. The starting point for the instant invention is preferably the creation of a full system backup 1000. Next, the user will preferably identify a problem application 1005, wherein problem application describes an application that is not working correctly or as expected. As a next step, the user will preferably be able to choose between two different options. He or she might choose to restore the configuration files and registry settings of the problem application 1010 or the user could choose to restore the configuration files and registry settings of all applications 1015, wherein this selection options might be presented to the user sequentially or for alternate selection. If the selection of either of these options brought the desired effect and the problem is solved 1020, the instant invention preferably terminates. But in the event that the selection did not bring the desired effect, the user will once again preferably be presented with the selection of restore options. He or she will preferably be able to choose between three options, wherein these options once again might be presented for sequential selection by the user or for alternate selection. The user can choose to completely restore the problem application 1025, to completely restore all applications associated with the operating system 1030, or to completely restore all applications that are contained in the full system backup 1035. If after the selection of one of these options the application is repaired and is working again 1040, the process of the instant invention will preferably stop, otherwise the instant invention will preferably automatically initiate a restore of the full backup image 1045.

Figure 11:
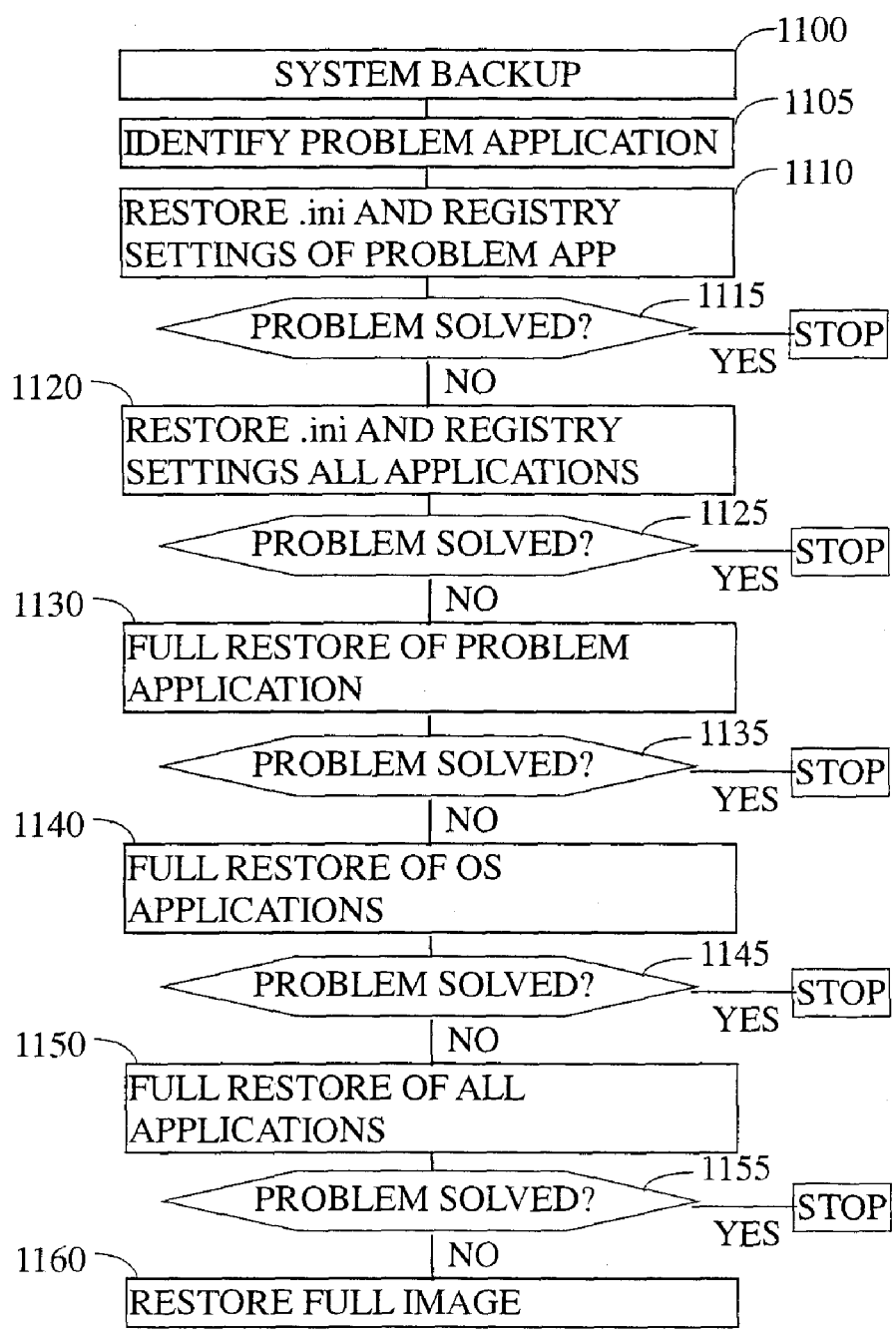
FIG. 11 illustrates a flowchart of the instant invention showing the instant invention in step-wise form.

Now turning to FIG. 11, this figure illustrates a preferred workflow of the instant invention where the user selectable repair options are selected in a step-wise manner. The file source for the instant process will preferably be the full system backup 1100 which will either already be available or will be created at the start of the process. The user will preferably identify the problem application 1105 and, as a first preferred selectable option, the instant invention will present an option to restore configuration files and registry settings to the user 1110. The selected restore process is initiated and, if the problem is eliminated 1115, the user will preferably be able to get back to his or her work.

However, if the problem is not eliminated the instant invention will preferably present the next restore option to the user, e.g., to restore configuration files and registry settings for all available applications 1120. If the user selects this option, the process will be initiated and afterwards the application will be started again to let the user determine if the previous restore eliminated the problem. If the problem is eliminated 1125, the process will preferably stop. However if the application still reports errors the instant invention will preferably present the next restore option to the user, e.g., the option to completely restore the problem application 1130. After selection of this option, the necessary data will be restored and the problem application will be started in order to determine if the problem is fixed 1135. If that is the case, the process of the instant invention will preferably end. If there are still problems however, the next restore option will preferably be presented to the user, which is to completely restore the applications associated with the operating system 1140. After the restore process has completed, the user will preferably once again determine if the option fixed the problem 1145. If so, the process will stop. If not, the instant invention will preferably present the next option, e.g., to fully restore all applications 1150. If the problem application works after this latest restore 1155, the restore/repair process will stop and the user will be able to get back to work. However, if the application still exhibits errors, the instant invention will preferably automatically initiate a restore of the full backup 1160. Alternatively, the user might be informed that this option is the last available possibility to repair the problem, that data loss might result, and be given the option to terminate the process.

CONCLUSIONS

Of course, many modifications and extensions could be made to the instant invention by those of ordinary skill in the art. For example in one preferred embodiment the process of the instant invention could be implemented as an automatic process, wherein the user only needs to initiate the process by defining the problem application and the steps of the problem solution will be executed automatically, only to be interrupted by notices informing the user if the application problem is fixed or not. Additionally, if implemented in a company local area network the system of the instant invention might automatically send out a message to tech-support if the only available option to repair the application problem is the restoration of the full backup image, which would most likely lead to the loss of documents and files of the user. Also, it would be possible to implement an automatic backup before the restore of the full backup image to preserve the documents and files that have been created since the last full system backup. In another preferred embodiment the system of the instant invention might be integrated into a local area network, wherein the specific backup images of client devices can be stored on network servers.

Note that when the term "hard disk" is used herein, that term should be understood to encompass both the singular and plural of that term as the case may require. That is, a user's "hard disk" might actually consist of several hardware disks that have been networked together to give the appearance of a single expansive disk. Additionally, in some cases the term hard disk might be used to refer to a partitioned portion of a single hard disk or the partitioned part of multiple separate hardware disks. Further, "hard disk" should be interpreted broadly to include magnetic and non-magnetic media (e.g., flash RAM, magneto-optical disks, optical disks, etc.) and any combination of the foregoing.

Further, when the term "backup" is used herein, that term should be broadly interpreted to include full disk backups, incremental backups, differential backups, etc., that might be stored on a single media item (e.g., stored on a single hard disk, optical disk, etc.) or stored on multiple storage items. That term should also be understood to include instances where multiple full backups taken at different times have been utilized to restore the required program specific files. Finally, it should be understood that in some cases the contents of the information files 200 will be determined during the backup process and, in those cases, the term "backup" should be understood to include copying files to a backup medium, as well as identifying the applications on the hard disk, identifying the associated program specific files for each application, identifying the OS files present on the hard disk, etc. On the other hand, in other embodiments the instant invention will operate on a backup that has been created by another application and, in that case, identification of the information files 200 will preferably be performed on the fly as part of the "restore" process.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of eliminating a correctable problem in a target application program running on a personal computer having a hard disk, comprising the steps of:
   a. obtaining a backup of the personal computer at a point in time before said problem occurred;
   b. identifying at least one application specific file associated with said target application program;
   c. restoring to said hard disk from said backup at least a portion of said at least one application specific file;
   d. after said at least a portion of said at least one application specific file has been restored, determining whether the problem has been eliminated;
   e. if said problem has not been eliminated after performing steps (b) through (d), determining whether any other application programs are on said hard disk;
   f. selecting at least one of said other application programs;
   g. for each of said selected at least one application programs, determining any application specific programs associated therewith that are stored on said hard disk;
   h. for at least one of said selected application programs having any application specific programs associated therewith, restoring to said hard disk from said backup at least a portion of said application specific files associated with said at least one selected application programs;
   i. after said at least a portion of said application specific files associated with said at least one selected application programs has been restored, determining whether the problem has been eliminated;
   j. if said problem has not been eliminated after performing steps (b) through (i), performing at least one of:
      (j1) performing a full restore of said target application program from said backup,
      (j2) performing a full restore of at least one of said other application programs from said backup, or,
      (j3) determining any OS applications present on said hard disk, and, performing a full restore of at least one of said determined OS applications present on said hard disk;
   k. if said problem has not been eliminated after at least performing steps (c) through (j), performing a full restore of said hard disk from said backup, thereby eliminating said correctable problem.

2. A method according to claim 1, wherein said application specific files comprise a registry setting and at least one .ini file.

3. A method according to claim 1, wherein said correctable problem is chosen from a list consisting of a crash of said target application program, a failure by said target application program to load or save an application file, and a target application program output that is inconsistent with an expected target application program output.

4. A method according to claim 1, wherein step (a) comprises the steps of:
- (a1) obtaining a backup of the personal computer at a point in time before said problem occurred, and,
- (a2) creating at least one information file in connection with said backup, said information file at least containing a pointer to said target application program and at least one pointer to an application specific file associated with said target application, and, wherein step (b) comprises the step of:
- (b1) using said at least one information file to identify at least one application specific file associated with said target application program.

5. A method of eliminating a correctable problem in a target program running on a personal computer having a hard disk, wherein said target program and at least one application specific file of said target program are stored on said hard disk, comprising the steps of:
- a. obtaining a backup of the hard disk at a point in time before said correctable problem occurred;
- b. identifying any application specific files of said target program;
- c. restoring to said hard disk from said backup said application specific files;
- d. after said application specific files have been restored, determining whether the correctable problem has been eliminated;
- e. if said correctable problem has been eliminated by performing steps (b) though (d), taking no further action;
- f. if said correctable problem has not been eliminated after performing steps (b) through (d), identifying at least one other application program on said hard disk;
- g. for each of said identified at least one application programs, determining any application specific files associated therewith;
- h. for each of said identified application programs, restoring to said hard disk from said backup at least a portion of said application specific files associated with each of said identified application programs;
- i. after performing steps (b) through (h), determining whether said correctible problem has been eliminated;
- j. if said correctable problem has been eliminated after performing steps (b) through (h), taking no further action;
- k. if said correctable problem has not been eliminated after performing steps (b) through (h), performing at least one of
  - (k1) performing a full restore of said application program from said backup,
  - (k2) performing a full restore of at least one of said identified application programs, or,
  - (k3) determining any OS applications present on said hard disk, and, performing a full restore of at least one of said OS applications; and,
- l. if said correctable problem has been eliminated after performing steps (b) through (k), taking no further action;
- m. if said correctable problem has not been eliminate after performing steps (b) through (k), performing a full restore of said hard disk from said backup, thereby eliminating said correctable problem.

6. A method according to claim 5, wherein said application specific files comprise a registry setting and at least one .ini file.

7. A method according to claim 5, wherein said correctable problem in said target program is chosen from a list consisting of a crash of said target application program, a failure by said target application program to load or save an application file, and a target application program output that is inconsistent with an expected target application program output.

8. A method according to claim 4, wherein step (a) comprises the steps of:
- (a1) obtaining a backup of the personal computer at a point in time before said problem occurred, and,
- (a2) creating at least one information file in connection with said backup, said information file at least containing a pointer to said target program and at least one pointer to an application specific file associated with said target application, and, wherein step (b) comprises the step of:
- (b1) using said at least one information file to identify any application specific files associated with said target program.

9. A method of eliminating a correctable problem in an application program running on a personal computer having a hard disk, wherein said application program and at least one application specific file of said application program are stored on said hard disk, comprising the steps of:
- a. obtaining a backup of said hard disk at a point in time before said correctable problem occurred;
- b. identifying any application specific files of said application program;
- c. identifying at least one other application program on said hard disk;
- d. for each of said identified application programs, determining any application specific files associated therewith;
- e. determining any OS applications present on said hard disk;
- f. sequentially performing a plurality of the following steps until the correctible problem is eliminated, thereby eliminating said correctable problem in said application program:
  - (f1) restoring from said backup said application specific files of said application program,
  - (f2) restoring from said backup any application specific files of said identified other application program,
  - (f3) performing a full restore of said application program,
  - (f4) performing a full restore of any identified OS applications present on said hard disk,
  - (f5) performing a full restore of any of said other identified application programs, and,
  - (f6) performing a full restore of said hard disk from said backup.

10. A method according to claim 9, wherein said application specific files comprise a registry setting and at least one .ini file.

11. A method according to claim 9, wherein said correctable problem in said application program is chosen from a list consisting of a crash of said application program, a failure by said application program to load or save an application file, and an application program output that is inconsistent with an expected target application program output.

12. A method according to claim 9, wherein step (a) comprises the steps of:
- (a1) obtaining a backup of the personal computer at a point in time before said correctable problem occurred, and,
- (a2) creating at least one information file in connection with said backup, said information file at least containing a pointer to said application program and at least one pointer to an application specific file associated with said application program, and, wherein step (b) comprises the step of:
- (b1) using said at least one information file to identify at least one application specific file associated with said application program.

13. A method of eliminating a correctable problem in an application program running on a personal computer having a hard disk, wherein said application program and at least one information file associated with said application program are stored on said hard disk, comprising the steps of:
- a. obtaining a backup of said hard disk at a point in time before said correctable problem occurred;
- b. identifying any information files of said application program;
- c. identifying at least one other application program on said hard disk;
- d. for each of said identified application programs, determining any information files associated therewith;
- e. determining any OS applications present on said hard disk;
- f. sequentially performing a plurality of the following steps until the correctible problem is eliminated, thereby eliminating said correctable problem in said application program:
  - (f1) restoring from said backup said information files of said application program,
  - (f2) restoring from said backup any information files of said identified other application program,
  - (f3) performing a full restore of said application program,
  - (f4) perfuming a full restore of any identified OS applications present on said hard disk,
  - (f5) performing a full restore of any of said other identified application programs, and,
  - (f6) performing a full restore of said hard disk from said backup,
  - wherein said plurality of steps must begin with step (f1), and, continue with at least step (f2),
  - wherein any steps that are performed after step (f2) must be performed in the order (f3), (f4), (f5) and (f6), and,
  - wherein said performance of said plurality of steps will terminate after a step where said correctable problem in said application program is corrected.

14. A method of eliminating a correctable problem in an application program running on a personal computer according to claim 13, wherein at least one of said information files associated with said application program is an application specific file of said application program.

15. A method of eliminating a correctable problem in an application program running on a personal computer according to claim 13, wherein steps (f1), (f2), and (f3) are performed in that order, thereby correcting said correctible problem in said application program.

* * * * *